US008612939B2

(12) United States Patent
Marenco

(10) Patent No.: US 8,612,939 B2
(45) Date of Patent: Dec. 17, 2013

(54) MULTI TRACE PARSER

(75) Inventor: Emanuele Marenco, Albenga (IT)

(73) Assignee: Siemens Aktiengesellschaft, Munich (DE)

( * ) Notice: Subject to any disclaimer, the term of this patent is extended or adjusted under 35 U.S.C. 154(b) by 401 days.

(21) Appl. No.: 12/972,975

(22) Filed: Dec. 20, 2010

(65) Prior Publication Data
US 2011/0154296 A1  Jun. 23, 2011

(30) Foreign Application Priority Data
Dec. 18, 2009  (EP) ..................................... 09180012

(51) Int. Cl.
*G06F 9/44* (2006.01)
(52) U.S. Cl.
USPC ........................................................ 717/128
(58) Field of Classification Search
USPC ........................................................ 717/128
See application file for complete search history.

(56) References Cited

U.S. PATENT DOCUMENTS

| | | | |
|---|---|---|---|
| 5,640,558 A * | 6/1997 | Li ................................. | 717/116 |
| 6,083,281 A * | 7/2000 | Diec et al. ...................... | 717/128 |
| 6,694,507 B2 * | 2/2004 | Arnold et al. .................. | 717/108 |
| 6,708,173 B1 * | 3/2004 | Behr et al. ............................. | 1/1 |
| 7,278,058 B1 * | 10/2007 | Narisi ........................ | 714/38.11 |
| 7,424,646 B2 * | 9/2008 | Smith ............................ | 714/45 |
| 2002/0078216 A1 * | 6/2002 | Pankovcin et al. ........... | 709/230 |
| 2002/0091995 A1 * | 7/2002 | Arnold et al. ................. | 717/124 |
| 2002/0095660 A1 * | 7/2002 | O'Brien et al. ............... | 717/127 |
| 2003/0061550 A1 * | 3/2003 | Ng et al. .......................... | 714/45 |
| 2004/0049716 A1 * | 3/2004 | Boudnik et al. ................. | 714/45 |
| 2005/0015741 A1 * | 1/2005 | Langkafel et al. ............ | 717/101 |
| 2005/0238010 A1 * | 10/2005 | Panigrahy et al. ............ | 370/389 |
| 2006/0277441 A1 * | 12/2006 | Edgar et al. ..................... | 714/38 |
| 2007/0002860 A1 * | 1/2007 | Cooper et al. ................. | 370/392 |
| 2007/0277057 A1 * | 11/2007 | Braun ............................. | 714/44 |
| 2008/0059436 A1 * | 3/2008 | Crocker ............................ | 707/3 |
| 2008/0301156 A1 * | 12/2008 | Sherman et al. .............. | 707/100 |

FOREIGN PATENT DOCUMENTS

EP           1202169 A1     5/2002

OTHER PUBLICATIONS

Sekhar Sarukkai, et al: "Sieve: A Performance Debugging Environment for Parallel Programs", XP-000382239, Journal of Parallel and Distributed Computing 8318, Jun. 18, 1993, pp. 147-168, No. 2, Orlando, FL, USA.

* cited by examiner

*Primary Examiner* — Don Wong
*Assistant Examiner* — Theodore Hebert
(74) *Attorney, Agent, or Firm* — Laurence A. Greenberg; Werner H. Stemer; Ralph E. Locher

(57) ABSTRACT

A method and a system for tracing the execution of multiple software products. The system includes: a collecting tool that is configured for collecting and internally listing in a list trace files; a determining device for determining the format of each trace file on the list, and selecting, as function of the format and for each trace file on the list, an associated parser, the associated parser being configured to read the listed trace file and extract trace data of the listed trace file; a translator for translating the extracted trace data into a new dataset; and a Graphical User Interface for displaying at least a subset of said new dataset.

20 Claims, 5 Drawing Sheets

FIG. 5

MULTI TRACE PARSER

CROSS-REFERENCE TO RELATED APPLICATION

This application claims the priority, under 35 U.S.C. §119, of European patent application EP 09180012, filed Dec. 18, 2009; the prior application is herewith incorporated by reference in its entirety.

BACKGROUND OF THE INVENTION

Field of the Invention

The present invention relates generally to the art of software debugging and more particularly to tracing data within a multi-processing environment and retrieving trace data on the basis of a query expression.

Usually, a software includes a trace feature designed for reporting various types of information or operational events related to its execution, like received inputs, generated outputs, called functions, username, etc, that will be called hereafter trace data. The software generally records said trace data chronically into datasets or files, bearing the name of log files, trace dataset, trace files and so forth, and which provide a record of the software state information according to a temporal scale. Hereafter, we will use the expression "trace file" in order to refer to said files or datasets. These trace files can then be used for software debugging by a skilled person, to resolve unpredicted or undesired results arising from the software execution. In other words, each trace generated by the execution of a software is a file called trace file that comprises information, called trace data, related to the execution of said software, and that might be used for software debugging. The trace refers thus to the single information about an execution of a task by a software and that is written in a file, said trace file.

Thus, tracing generally refers to acquiring information on the execution of a software, like the events characterizing the software execution and that are translated into data traces, in order to verify the correct execution of said software. In other words, tracing refers to an analysis of the execution of a software, in particular the execution of software application called hereafter application. For instance, an application suite may comprise multiple applications interacting with one another, and that are operated by multiple processors in one or several computer machines, belonging in particular to a same environment. Consequently, two applications may interact with each other, while being executed by two different machines belonging to the same environment. It results that the analysis and diagnosis of a problem arising from a bug in the execution of at least one application in a distributed environment requires reading multiple formats of trace files generated by the different applications belonging to said distributed environment. Indeed, different format are used in a trace file for representing different, or sometimes a same, kind of event(s). Consequently, trace data are characterized by distinct formats, depending for example on the reported operational event, on the software, and so on. Thus, traces generated by the execution of a software often lead to a huge quantity of information that is difficult to analyze. Multiple software running at the same time are multiple sources of traces with multiples formats used for representing a same or different kind of events. Moreover, due to the complexity of modern software and their heavy reliance, tracing a problem arising from the incorrect execution of a software is not trivial and requires methods and devices for diagnosing and verifying the proper execution of said software in a distributed environment.

A first method for checking the traces generated by the execution of an application is to read its traces one by one using a tool specific for each type of trace, said tool being generally provided by the application that wrote the trace. The type of trace is generally provided by a header of the trace file, and indicates for example if a Time Stamp exists, the trace file format, and other information related to the trace itself. Unfortunately, in many cases the tool provided by the application that wrote the trace, for reading said trace neither allow a multiple reading of different trace files of a same application source (i.e. reading for example traces generated by two instances of a same application/source, or two different trace files from a same application/source and that are structured in a same format), neither different trace files having a different format and consequently, a different structure. Thus, it is not possible to have a view, at a same time, of the trace data provided by different softwares. Consequently, a complete trace analysis has to be done in different successive steps. For these reasons, trace reading requires a skilled user able to correlate all readings of the traces, which is time consuming since the skilled user wastes a lot of time to check all the information.

A second method used for diagnosing the execution of a software refers to automated multiple analysis methods that are mainly based on the two following processes, respectively a first and a second process.

The first process is more invasive than the first. This first process consists in creating a common trace for each application involved in the tracing analysis and then analyzes said common trace, with a common tool as explained in U.S. Pat. Nos. 6,708,173 B1, 7,278,058 B1, or in patent application publication US 2006/0277441 A1. This first process has one main disadvantage: it can be only applied to applications whose traces can be formatted in a such way they can be read by the common tool, and unfortunately, it is usually not possible for a user to modify the trace generated by an application of another company, and sometimes even to modify the trace generated by an application owned by the company's user, like traces created by an old software that has not be maintained. This implies that this first process is only applicable to a subset of traces (i.e. traces generated by modifiable applications, i.e. said applications whose traces can be formatted), and all other traces (i.e. traces generated by unmodifiable applications—by opposition to modifiable applications) have to be read with tools different from said common tool, resulting in a lost of a central reading (i.e. more than one tool are required in order to read said traces), and in an increasing difficulty of reading said traces due to the complexity of gathering the information. Consequently, said first process involves skilled persons for managing and analyzing data traces arising from the execution of multiple applications.

A second process for processing multiple traces arising from various applications at the same time consists in trace transformation, or in other words in transforming in a standard format the information (i.e. the trace data), contained in the trace file that have to be analyzed, so that, for example, each trace file has a same standard format, or, so that each trace file contains a special key like a timestamp designed for correlating multiple traces, as disclosed for example in U.S. Pat. No. 7,418,450 B2. This second process duplicates the information contained in the trace file by rewriting all trace data in said standard format and needs to record them in a special repository from which the user may retrieve trace data later (cf. U.S. Pat. No. 7,424,646 B2). Consequently, a main disadvantage of this second process is the duplication of data written in the trace files, requiring an external structure like a database to store the new data that are in the standard format. Moreover, the use of said special key reduces the set of trace files that it is possible to analyze, only to a subset of all collected traces: only the trace file having said special key inside their trace data can be analyzed.

SUMMARY OF THE INVENTION

It is accordingly an object of the invention to provide a multi-trace parser which overcome the above-mentioned disadvantages of the heretofore-known devices and methods of this general type and which provides for a method and a system for tracing in real time the execution of multiple software in particular in a distributed environment, the method and system being free of a limitation on a trace format, free of a trace storage, and capable of showing to a user original unmodified traces in a single environment.

With the foregoing and other objects in view there is provided, in accordance with the invention, a method for tracing an execution of a plurality of software products, the method which comprises:

collecting and internally listing in a list at least one trace file;

for each trace file of the list, determining a format of the list and selecting in dependence on the format an associated parser designed for reading the trace file;

reading the listed trace file by way of the associated parser;

extracting trace data;

translating the extracted trace data into a new dataset configured for merging and filtering;

showing at least a subset of the new dataset on a Graphical User Interface.

In other words, the objects of the invention are achieved according to the present invention with respect to the method by a method for tracing, in particular in real time, the execution of multiple software, the method comprising the steps of:

collecting and internally listing in a list, in particular at runtime, at least one trace file, in particular by means of a collecting tool capable of achieving a selection according to a prefixed logic designed for selecting a specific trace file, for example, trace files comprising a time stamp belonging to a user-predefined time range, or trace files having a specific format, said list being created at runtime;

for each trace file of said list, determining its format and selecting in function of said format an associated parser designed for reading said trace file;

reading the listed trace file by means of said associated parser, said associated parser being in particular capable of parsing said listed trace file, notably on a user-query basis, the user-query being designed for specifying trace data that should be extracted by the associated parser;

extracting trace data, notably according to said user-query basis, in particular by means of said associated parser;

translating/transforming the extracted trace data into a new dataset designed for being at least merged and filtered, and in particular shown on a Graphical User Interface;

showing at least a subset of said new dataset on a Graphical User Interface.

The above and other objects are also achieved according to the present invention with respect to the system by a system for tracing, in particular in real time, the execution of multiple software, the system comprising:

a collecting tool, designed for collecting and internally listing in a list, in particular at runtime, at least one trace file, said collecting tool comprising in particular a prefixed logic designed for selecting a specific trace file, for example, trace files comprising a time stamp belonging to a user-predefined time range, or trace files having a specific format;

determining means for determining the format of each trace file of said list, selecting, in function of said format and for each trace file of said list, an associated parser adapted for reading said trace file;

associated parser designed for reading the listed trace file and extracting trace data of said listed trace file, notably on a user-query basis. In particular, said parser is capable of parsing said listed trace file, notably on said user-query basis, the user-query being designed for specifying trace data that should be extracted by the associated parser;

means for translating/transforming the extracted trace data into a new dataset designed for being at least merged and filtered;

a Graphical User Interface designed for showing at least a subset of said new dataset.

In particular, the method and the system according to the invention are also capable of tracing offline the execution of multiple software. Thus, the whole analysis of the execution of multiple software, i.e. the tracing, might be done in real time, i.e. at run time, or offline, i.e. at a time next to a time of the software execution.

In particular, the prefixed logic of said collecting tool might be designed for selecting or finding a specific trace that is a modified trace file comprising a key externally provided. For instance, the key might be:

one or more time stamps that allow an identification of traces modified during a time range; or a special word, for example, either a character or a number, that the user wants to search inside a trace file, and thus corresponding for example to a specific trade data. Note that in this last case, the collecting tool might be able notably to recognize a specific trace format, which allows said collecting tool to directly read a trace data characterized by said specific trace format and comprising said key.

According to the invention, the list is in particular an internal list, i.e. a list that is not shown to the final user, but rather only used during on the fly operations. The determining means are in particular capable of determining the trace file format, notably by recognizing the name of the trace file itself and/or a signature of the trace file, according to a rule matching method. For example, the name could be used as a first filter for determining said format, so that resources are not wasted by choosing complex criteria/rules for determining said format. Said first filter is thus capable of a first sorting of the trace files, resulting in a first sorted trace files. Then, at least another filter is able to process another sorting of said first sorted traces files, i.e. a refinement of the previous obtained first sorted trace file, so that iteratively, said trace formats are determined. Determining the format of the trace file is mandatory in order to select a right parser capable of reading the trace data.

In particular, the determining means are able to determine the format of the trace file according to a rule matching method based on the name of the format of said trace file: the name is not compared with a fixed string, but using a rule previously defined by an "administrator" user. This rule defines in particular a set of names that are designed for identifying a format of trace: for instance, all trace files that start with a special character and have a timestamps at their end, or all trace files that do not have some character inside a path of the trace file. The method according to the invention advantageously allows a creation of a large filter that accepts every trace file, as well as it also allows to adapt the filtering criteria according to matching rules, so that it reduces a number of trace files matching said filtering criteria to few cases (for example 1-10 cases). The rules that describe the names of the trace files are advantageously capable of covering all the possible values of variables involved in the determination of said names.

Another way for said determining means for determining the right format of said trace files relies on the signature of said trace file. The signature is a set of bytes inside the trace file that is specific to each format of trace file. According to the invention, said signature might be used for determining the format of the trace file. This set of bytes can be either fixed either dynamically determined by a prefixed rule. Typically, the determining means are capable of determining the signature of a trace file by means of at least one matching rule that defines at least one string or one set of strings used by said determining means for comparing said string with a string portion of the trace file. In particular, the signature of the trace file, and thus its format, is determined by said determining means once said string (or set of strings) matches said string portion. Said string or set of strings are thus parameters allowing the determination of the signature corresponding to a specific format of a trace file.

For example, in the case of a text format, the signature of a trace file might be determined by a rule that defines a set of strings, or a fixed array of bytes, to be matched with a string portion inside the trace file. According to the method, the rules that describe the signature of a text format trace file are capable of covering all possible values of variables involved in a text format trace file.

Actually, for a trace file having a binary format, the signature is matched with a prefixed set of bits at a specific position. Advantageously, there is no technical constraint to use a rule for checking the signature of a binary trace file, contrary to the fixed array of bytes used for the text format trace file.

Each trace file of the list is in particular automatically processed by the determining means for determining its format, and then associated at least with one kind of parsing, said kind of parsing being a couple of values that define a parser category and a trace data that will have to be extracted from the trace file according to the user-query basis. In particular, one trace file might be associated to one or several kinds of parsing, giving rise to multiple parsing.

For example, to separate information of the header section of a trace file from information of another section of the trace file, the method according to the invention is capable of giving an opportunity to a user to create two kinds of reports by using two kinds of parsing, resulting in showing said header section and said another section in two different ways in the Graphical User Interface for a better view of the trace data.

Another example of multiple parsing is in particular reading each data of each trace file together according to a reading scheme that allows collecting and grouping information (like trace data corresponding to a number of records that satisfies a specific condition or a count of records showing an activation of an application and its deactivation). In this case of multiple parsing, a same parser is used for reading listed trace files, but user-queries associated to the reading of said parser are different.

In other words, the method according to the invention uses a set of traces that are internally collected and listed and serve later as input for parsing or multiple parsing. From this initial listing, the trace files corresponding to said set of traces are then separated into multiple lists depending on the format of the trace file that is determined in particular iteratively by said determining means, and depending on the trace data that should be displayed according said user-query basis. The user-query is in particular created automatically according to a specific trace analysis requested by a user or manually by a user, who specifies for example, which kind of trace data should be diagnosed, which information is relevant. The user-query is in particular an order that specifies the trace data to be extracted according specific information requested by the user, said order being executed on the fly by said parser. A syntax of the user-query might be in particular equal for all the traces read by a parser.

According to the invention, the single processing phase on a trace file, i.e. the reading of the trace file and extracting its data by means of the parser, might be in particular advantageously done thanks to a parser using a COM interface, like for example a Microsoft's package named Log Parser 2.2 that allows the parsing of text and binary trace files using a COM interface (i.e. Component Object Model interface) that allows the creation of a dynamic COM object. Of course, the single processing phase might be done by means of other techniques known by the skilled person in order to access to a structure of a file, like a trace file, and dynamically define queries to access relevant data of said file. An example is the Link library of the Microsoft.NET Framework 3.5 that may achieve the single processing phase.

In particular, after parsing trace files and extracting relevant data by means of a parser capable of using a COM interface, the extracted data are advantageously automatically translated/transformed via the COM interface, so that said new dataset is a proprietary dataset of the COM object. In other words, the relevant trace data are translated by means of the COM interface to a more common type of datasets, i.e. said new dataset, that is in particular a COM object, and that have more features like merging and filtering, said features being in particular used within the Graphical User Interface. Thus, once the kind of parsing has been identified, the present invention allows a transformation of the extracted data into a COM object independently to the format of the trace file, in order to get as return said new dataset designed for being shown on the Graphical User Interface.

In particular, the user-query and the format of the file to be processed during said single processing phase are automatically provided to the COM object, in particular, by a user via said Graphical User Interface, or by a predefined rule integrated to the system for tracing, so that an initial result of the single processing phase can be shown to the user as soon as trace data are extracted by the parser and translated to said new dataset. In particular, the user-query used for a first single processing phase is a canonical query, i.e. a query that allows processing the trace data with a standard interface common to all type of trace files, and consequently which advantageously allows then an easy merging of the new dataset that is obtained, in particular according to the steps described below. In particular, the canonical query is a query allowing a comparison and a merging of multiple new datasets using common fields to join the trace data.

In particular, the COM object used for the single processing phase allows an extension of the capability of parsing by developing and integrating special COM objects characterized by a special COM interface. According to the invention, said special COM interface is in particular capable of implementing at least one reading method designed for reading records and fields of the trace file that have to be accessible using said user-query, for example SQI-like queries.

The trace file having a text format might be read and parsed using the COM object and reading method exposed within said COM object, while specifying the right query. In particular, the determining means comprise a switch that is able to automatically recognize a trace file format and apply the suitable query and parser to gain the desired result, i.e. relevant information satisfying said user query.

More difficult is the case of a binary trace file. In this case, the reading method might be in particular implemented externally to the COM interface. An implementation for each kind of binary trace files would be onerous, since it would involve a skilled person for each new binary trace file. For this reason, a new add-in added on the top of the COM object is in particular designed and implemented for reading a generic binary trace file. Advantageously, said add-in might be updated for taking into account of new kinds of trace file formats. Consequently, the method according to the invention allows an external update of the trace file format free of modifications of any steps of said method.

Indeed, the trace file is in particular only described externally in a repository or in an initialization file or in an external library, that is capable of implementing a reading method based on reading parameters for reading a structure of the trace file. In particular, the binary trace file might be described as a sequence of sections made by records of a same kind. In particular, the section, the records and the fields of the trace file might be delimited by said reading parameters as described in the following example.

For example, a single section of the trace file might be delimited in various ways by:
  one or a combination of prefixes, said prefix being a fixed sequence of bytes at the beginning of the single section;
  one or a combination of suffixes, said suffix being a fixed sequence of bytes at the end of the single section;
  the number of bytes of the single section;
  a number of records inside the single section.

According to the invention, the single section can be also skipped: its content is not used for parsing, but only to seek a specific position within the trace file and reach a meaningful section.

Each single section is a sequence of records, each single record being recognized using a similar method as previously defined for the single section, i.e. the record is delimited by
  one or a combination of prefixes, said prefix being a fixed sequence of bytes at the beginning of the single record;
  one or a combination of suffixes, said suffix being a fixed sequence of bytes at the end of the single record;
  the number of bytes of the single record;
  a number of fields inside the single record.

According to the invention, the single record might be also skipped. In other words, its content is not used for parsing, but only to seek a specific position inside the section and reach a meaningful record.

Then, each records is a sequence of fields, each single field being recognized using a similar method as previously defined for the single section and the single record. The single field is for example delimited by
  one or a combination of prefixes, said prefix being a fixed sequence of bytes at the beginning of the single field;
  one or a combination of suffixes, said suffix being a fixed sequence of bytes at the end of the single field;
  the number of bytes of the single field.

The single field can be also skipped, that is, its content is not used for parsing but only to seek a specific position inside the record.

In particular, according to the invention, once a sequence of bytes describing the value of the fields satisfying the user-query is reached, then, said sequence of bytes is
  skipped using a skipping operation (for example, the field might be marked as "not to be parsed") if the field value comprise does not have to be parsed. In particular, an operation that is just a placeholder is used for skipping said sequence of bytes if the field value has not to be passed to the parser. In this case, the parsing operation is skipped and the position of said field within the trace file is moved on the next field.
  translated using a translation made by an invocation of a standard conversion method described within an initialization file of the COM interface if the field value might be translated using said standard conversion methods of the COM interface;
  translated using a special custom conversion, if for example the field value is encrypted using a known method that is not described by any conversion library. In particular, the COM interface might call said external library to translate the field value by means of said add-in top to the COM object. In particular, said external library provides only the parsing operation of the fields.

Advantageously, according to the invention, the integration of the external library to the parser avoids a development of a custom parsing for each kind of binary trace file that is not provided with a standard conversion method. Moreover, the trace format is read by just describing its structure by means of said external library and using reading parameters.

The method according to the invention might be better understood with the following example. Let's have a trace with a fixed length header section that is not useful for the analysis, followed by records composed by multiple fields ending with a terminator character, but with the first bytes of the records that has to be skipped (like SharePoint traces). In this case the reading parameters according to the invention describe two sections: a first section that has a fixed length whose value has to be skipped and a second section that comprises a field with a fixed length whose value is not parsed, and other fields filling suffix bytes.

According to the invention, the new dataset provided by the parser is designed for being shown on a grid to the user, in particular within said Graphical User Interface. The grid is in particular designed for filtering again the data of the new dataset in order to show only wanted information and specific set of data arising from the original trace file. In particular, this filter does not erase the data from the new dataset, but hides them for a better user view. Advantageously, since some data are just hidden, the user can switch back to a previous set of data or user view in one step. Moreover, the grid allows dividing said new dataset in multiple subsets. In particular, the grid is also designed for hard filtering of the data by just modifying the canonical query directly via the Graphical User Interface. The canonical query is modified for example by adding more filters for tracing the trace data. Advantageously, modifying the canonical query may reduce the resources used by the system for tracing.

According to the invention, at least two new datasets produced on the fly by the reading of the data files and the extraction of relevant trace data can be merged together choosing the dataset produced by trace files already parsed in order to form a new merged dataset comprising relevant information/data for the user. This merging of at least two new dataset is in particular independent of adding a new filter to the canonical query, but depends on a modification of the canonical query itself. It means that adding a new filter for filtering collected trace data preserves the merging, which can in particular automatically be updated. And at the opposite, modifying the canonical query might modify the collected trace data and consequently, the Graphical User Interface is capable of asking for a new user merging. Moreover, according to the invention, multiple new datasets might be merged together using at least one common trace file field as criterion for joining the trace data. In addition, the merging is independent of the type of field, i.e. any field can be used for merging.

If a user, before starting to process trace files, adds a new filter that respects the COM interface used for all other filters, in other words, if the output fields of the filters are equals for all filters, then the merging operation might be done without any constraints on the output fields. If a user adds a new filter that has at the most only one field in common with previously used filters, then the merging operation is still possible using said field in common as a key to link the trace data. If the user adds a new filter with no fields in common with a previous filter, the result, i.e. the output, might contain all the fields, i.e. both the new filter fields and the previous filter fields, and the final records might contain the records produced from the new filter and the records from the previous filter. In other words, the obtained dataset is a sum of the datasets obtained from the previous and the new filter.

According to the invention, the Graphical User Interface comprises at least one report capable of showing, merging and filtering said multiple new datasets in order to obtain at the end at least one simple set of data relevant for an analysis, i.e. so that it allows a simple correlation between all data. In particular, at least two of said multiple new datasets might be merged together before, or respectively after, applying a common filter, respectively separate filter. Like before, the filter only hides unwanted data, and more than one filter might be applied on a same field. Of course, each obtained new dataset might be stored at any time on any kind of storage, like a hard drive, but this storage feature is not mandatory.

Other features which are considered as characteristic for the invention are set forth in the appended claims.

Although the invention is illustrated and described herein as embodied in a multi trace parser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 schematically shows an embodiment of a Graphical User Interface according to the invention.

DETAILED DESCRIPTION OF THE INVENTION

Figure 1:
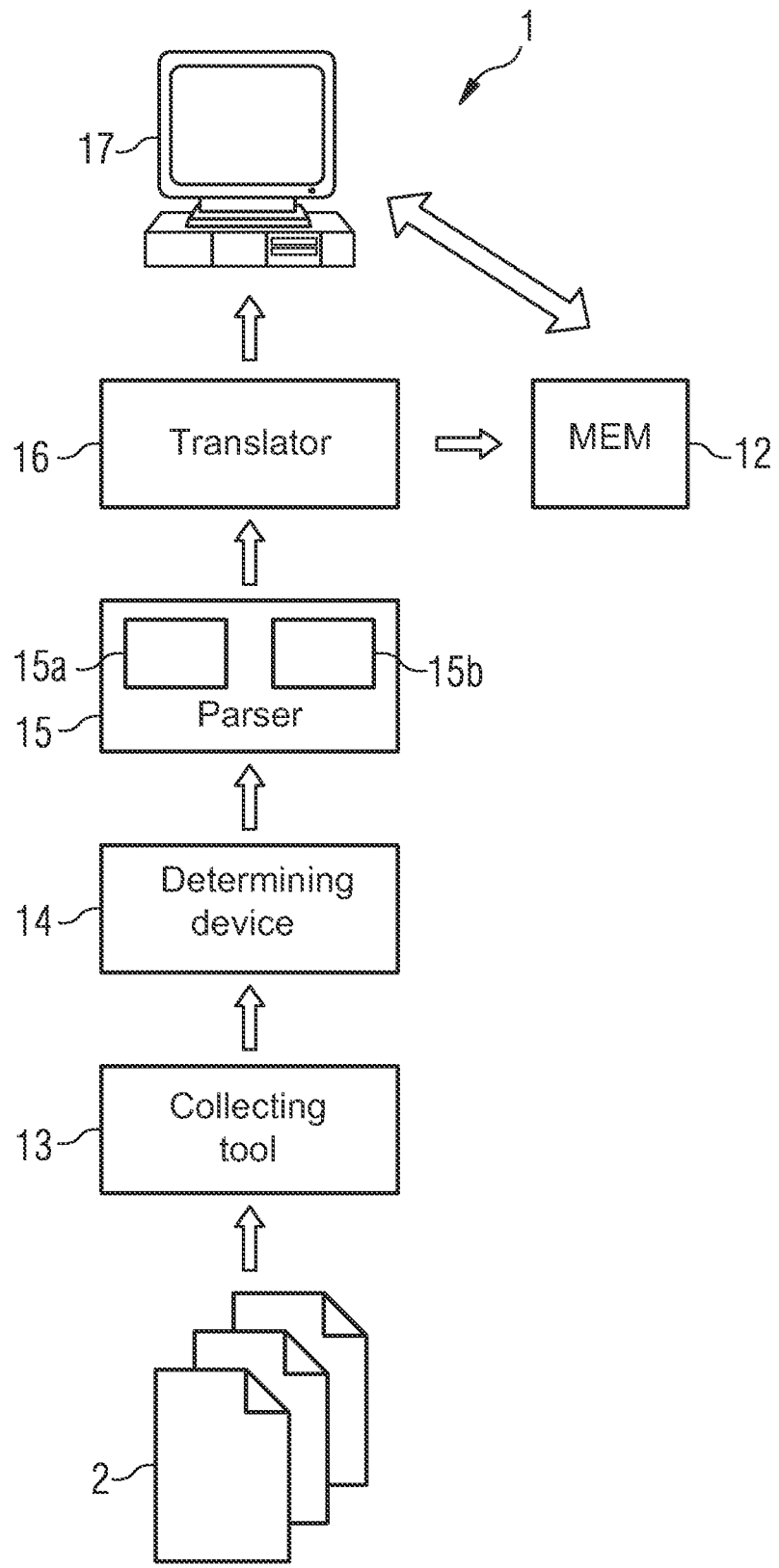
FIG. 1 schematically shows a schematic block diagram of an exemplary system for collecting trace files according to the present invention.

Referring now to the figures of the drawing in detail and first, particularly, to FIG. 1 thereof, there is shown a schematic block diagram of an exemplary embodiment of a tracing system 1 for collecting trace files 2 arising from the execution of multiple software according to the present invention. In particular, the system for tracing comprises:

a collecting tool 13, designed for collecting and internally listing in a list trace files 2, said collecting tool 13 comprising in particular a prefixed logic designed for selecting specific trace files 2, in particular if a trace file format is recognized by the collection tool;

determining means 14 for determining the format of each trace file 2 of said list, and selecting, in function of said format and for each trace file of said list, an associated parser 15 adapted for reading said trace file 2. In particular, the determination of the trace file format is performed according to a rule matching method capable of recognizing the name and/or the signature of the trace file;

said associated parser 15 designed for reading the listed trace file and extracting trace data of said listed trace file on a user-query basis. In particular, said parser is capable of parsing said trace data using a standard interface 15a if the type of trace format is a standard format, or a custom user interface 15b if the type of the trace file format is not standard;

means for translating 16, or a translator, for translating the extracted trace data to a new dataset designed for being at least merged and filtered;

a Graphical User Interface (GUI) 17 designed for showing at least a subset of said dataset.

Advantageously, the system for tracing according to the invention is able to show a global view free of a need of a special trace format, of a trace modification, of a trace storing in order to perform said single processing phase. Moreover, the Graphical User Interface 17 is designed for allowing the user to define one or more query. In particular, the Graphical User Interface 17 is capable of proposing multiple options to the user for retrieving trace data. In particular, the system for tracing 1 according to the invention is capable of showing a list of trace files satisfying conditions or criteria requested by the user via at least one of its query, and in particular, trace files satisfying conditions or criteria of at least one previous query of the user. The application may also store in a storage device 12 the result of the analysis of the trace files to avoid loosing data. Advantageously, the trace files 2 might be also stored to avoid rewriting, in particular if they are used as circular buffer, or simply marked for future analysis.

Figure 2:
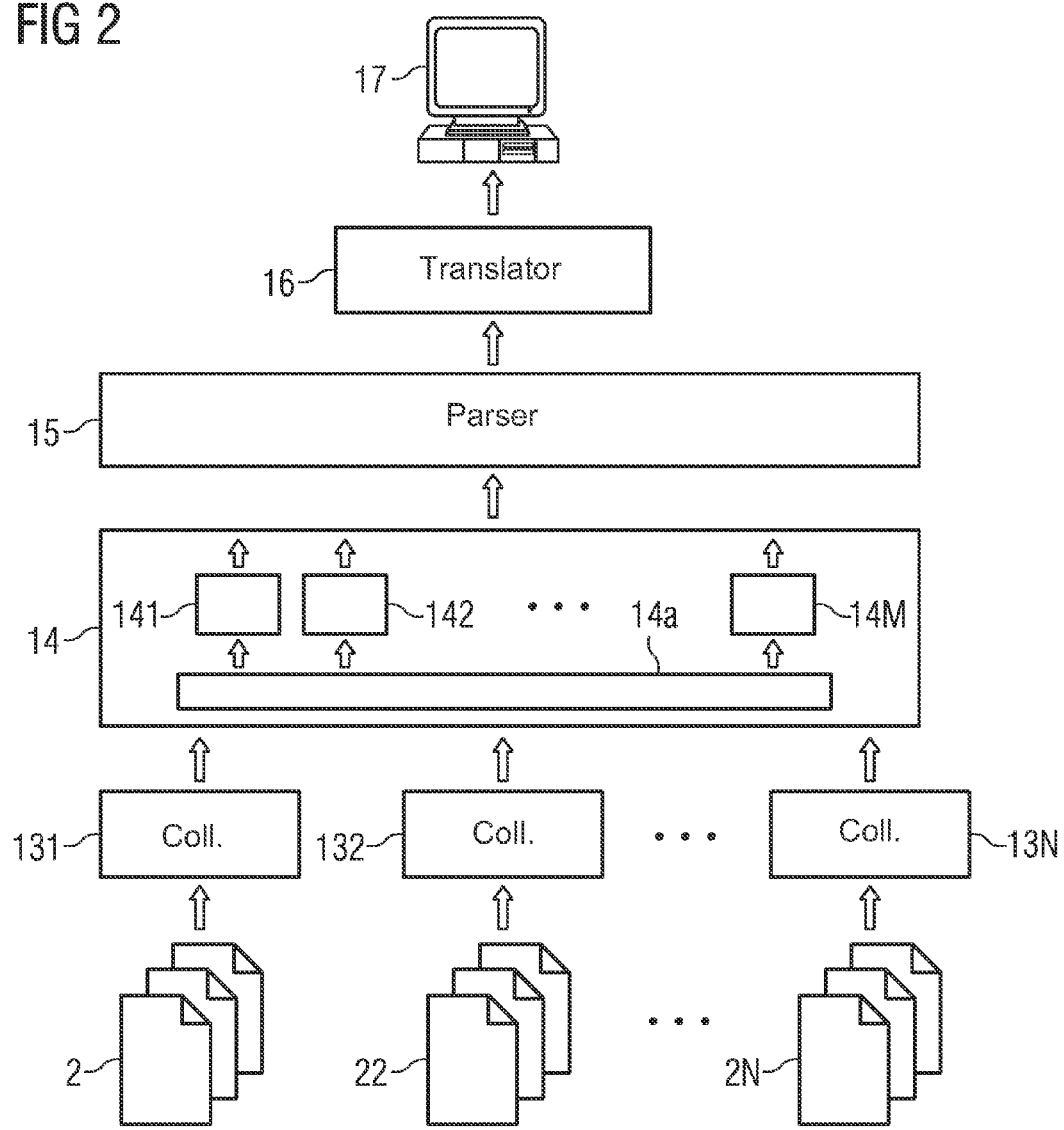
FIG. 2 schematically shows a schematic block diagram of an exemplary system for multiple parsing according to an embodiment of the present invention.

FIG. 2 schematically shows a schematic block diagram of an exemplary system for multiple parsing according to an embodiment of the present invention. In particular, a number N of trace files 21-2N are collected by a number N of collecting means 131-13N and then being split by a switch 14a comprised into the determining means 14. Said switch 14a is able to automatically recognize the trace file format and to class each trace file according to a type 141-14M of trace file format or of query, in particular according to a number M of types. All trace files are then processed by one parser 15 in order that means for translating 16 might transform the extracted trace data to a new dataset that is presentable by means of the Graphical User Interface 17.

Figure 3:
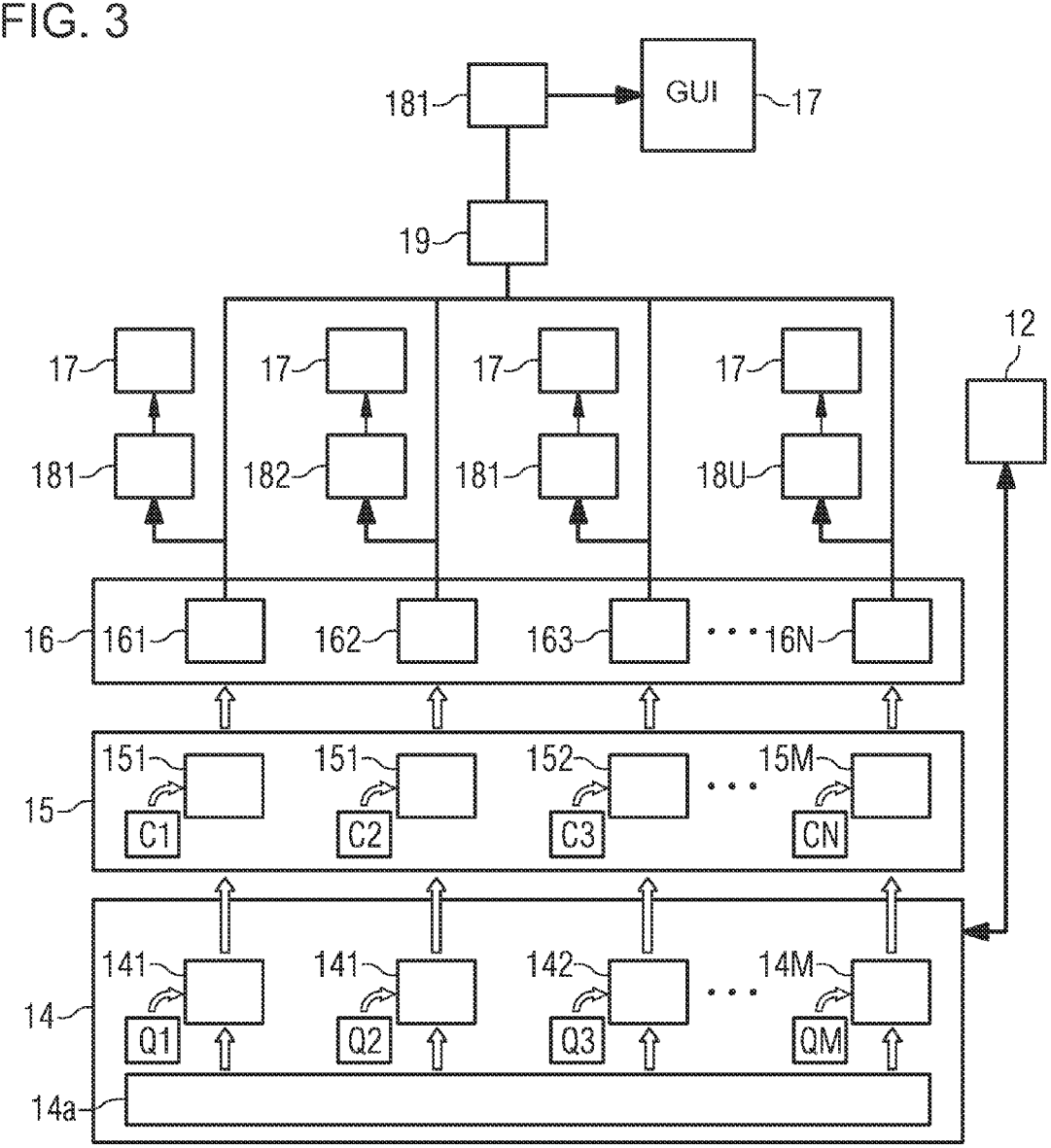
FIG. 3 schematically represents an exemplary schematic block diagram of an embodiment of a single processing phase according to the invention.

FIG. 3 schematically represents an exemplary of a schematic block diagram of an embodiment of a single processing phase according to the invention. A switch 14a is capable of separating trace files into different groups 141, 142, . . . , 14M, in particular in a number M of groups corresponding to different types of trace files format, or according to different user queries Q1, Q2, . . . , QM, in particular a number M of different user queries. In particular, the switch 14a is able to associate a parser 151, . . . , 15M adapted to a trace file format (in particular, same parser for a same trace file format), notably on the basis of information stored in a repository or external library 12. Trace files of a same type might be processed according to multiple queries C1, C2, ..., CN. One parser 151, ..., 15M is then assigned for one of said type 141, ... 14M of trace file according to one or more queries C1, ..., CN. For each query C1, ..., CN, once the trace data extracted by the parser 151, ..., 15M have been translated/transformed into a new dataset 161, ..., 16N, said new dataset might be shown after filtering individually by filters 181, ..., 18U on the Graphical User Interface 17, or merged 19 with other new dataset arising from other queries to be presented together, in particular after a common filtering by a filter 181, on said Graphical User Interface 17. Advantageously, the single processing phase and the merging and filtering of the new dataset are done on the fly, i.e. at runtime, and can thus be repeated in a very short time.

Figure 4:
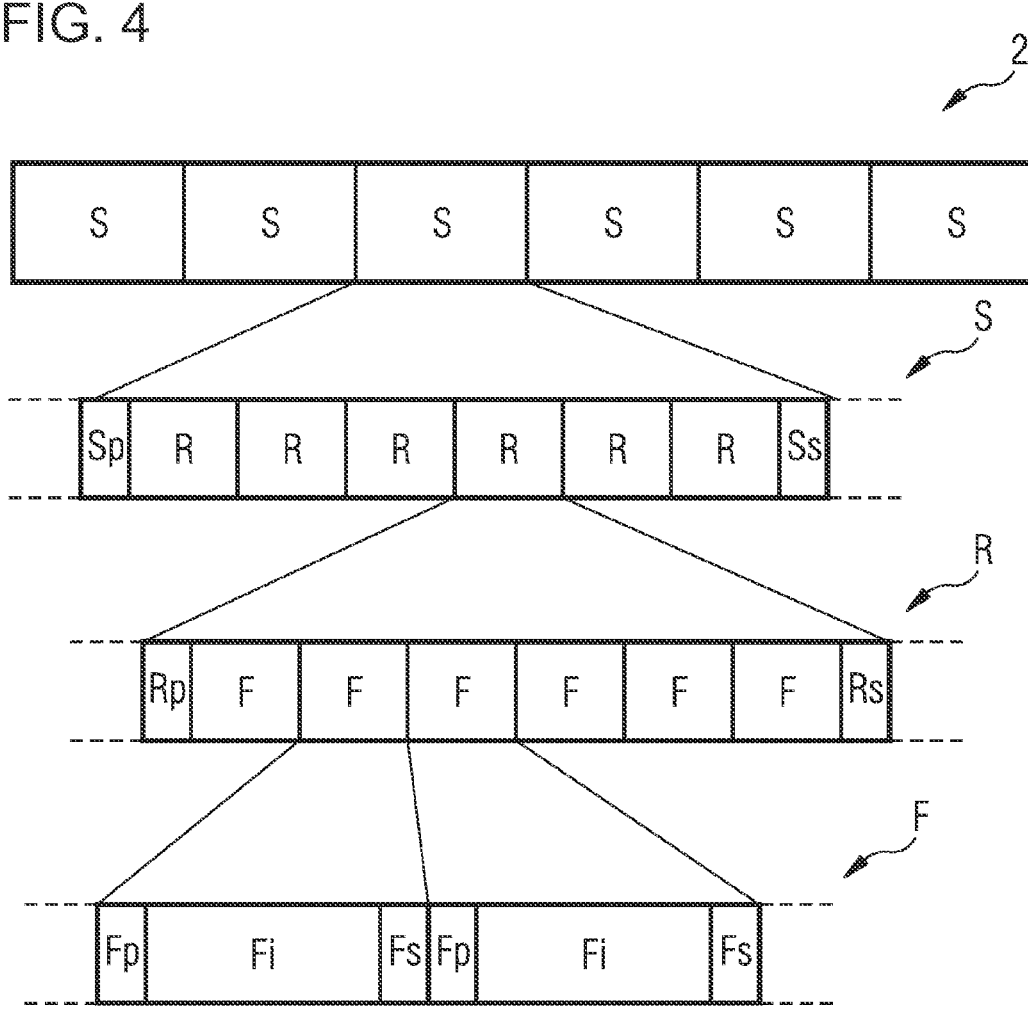
FIG. 4 schematically shows a reading method of a trace file according to the invention.

FIG. 4 schematically shows a reading method of a trace file 2 according to the invention. In particular, the trace data of the trace file are read according to a reading of a structure of the trace file 2. In particular, the trace file 2 might be described as a sequence of sections S, each section S comprising in particular records R of a same kind, and each records R comprising fields F. FIG. 4 shows in particular an enlargement of the trace file 2 by enlarging a section S comprised in the trace file, a record R comprised in said section S and finally a field F comprised in said record R. The trace file 2 comprised thus a set of sections S. Each section S might have limits defined by a prefix Sp or a suffix Ss (or both of them) or by a number of bytes. Each section S might comprise also a set of records R, each record having limits that might be defined by a prefix Rp or a suffix Rs (or both of them) or by a number of bytes. Each record R might comprise also a set of fields F. Each field F might have limits that might be defined by a prefix Fp or a suffix Fs (or both of them) or by a number of bytes. Finally, a single field Fi is mapped to a standard data type, for example integer, float, timestamp, etc.

Figure 5:
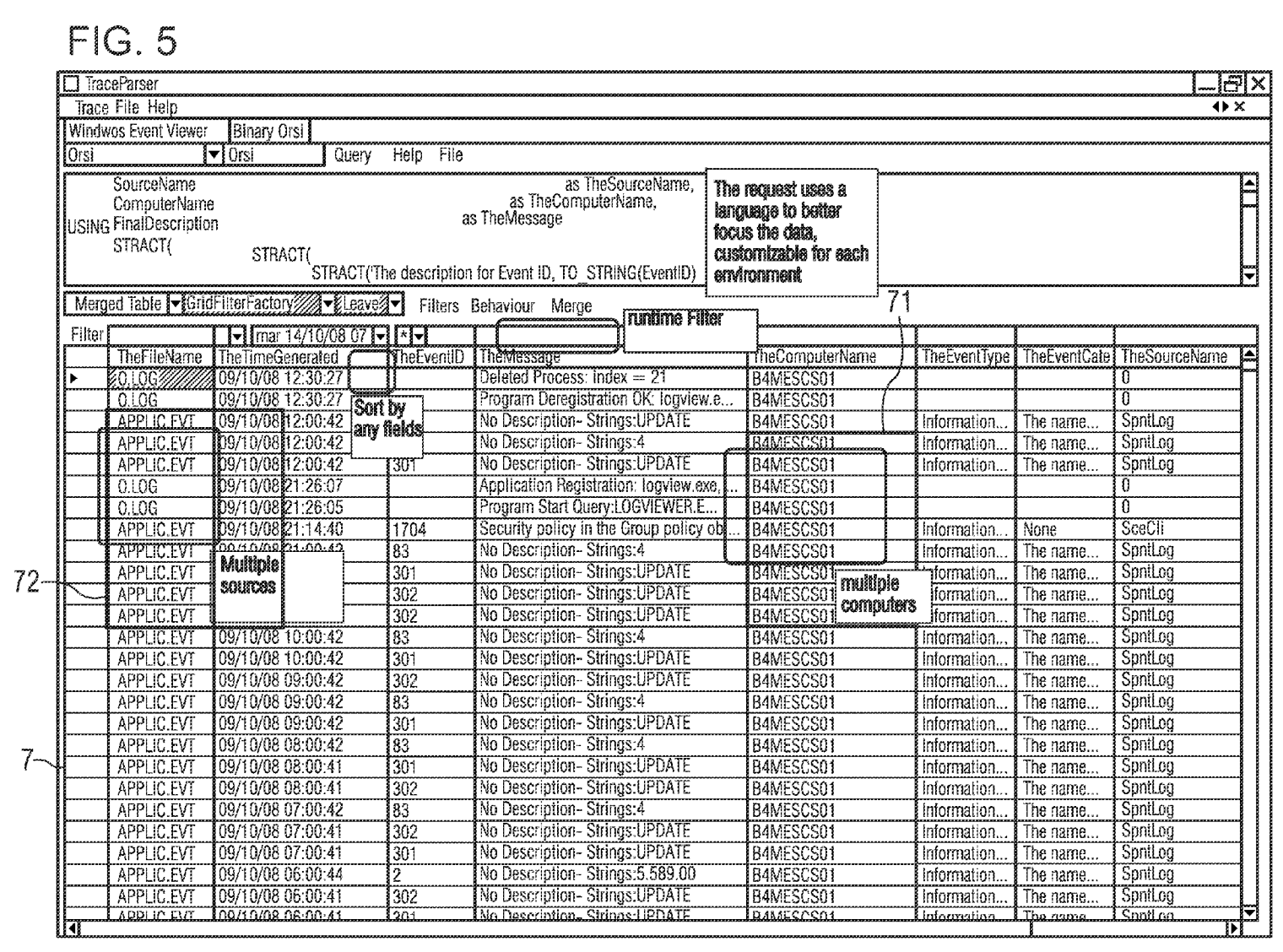

FIG. 5 schematically shows an embodiment of a Graphical User Interface 7 according to the invention. Advantageously, the Graphical User Interface 7 is capable of presenting trace data arising from multiple computer machines 71 and various software sources 72. The Graphical User Interface 7 is also designed for allowing the user to insert and run a query. Each new query that is inserted by the user and then run is capable of automatically activate a new parsing of the trace data if a canonical query is modified. The Graphical User Interface 7 is advantageously capable of presenting extracted and merged trace data in a filterable grid that can be filtered again for further analysis.

Finally, the method and the system according to the invention have the following advantages:
  they give the possibility of collecting and analyzing trace files in a manner free of trace file format limitation, while providing inside one unique Graphical User Interface environment at least one result/output from an analysis of said trace files based notably on a user query. They thus avoid the user reading trace files using different tools: indeed, the user can read many trace files on the fly, within a same Graphical User Interface;
  the trace data can be filtered out dynamically on the fly, i.e. in real time, using a special language (SQL-like queries, native of the COM object) and the Graphical User Interface is designed for allowing custom filtering on each field of a trace data;
  they allow to find in a multi-machines environment, which trace file was modified during a time range defined by a user via the Graphical User Interface. Consequently, they allow collecting trace files related to said time range, and showing/processing the collected trace file at a temporally later time (i.e. a time belonging to a period that follows temporally said time range);
  in the case of an offline environment for which collected trace files refer to three machines, the method and the system according to the invention are able to discover the complete sequence of all the operations, i.e. the sequence of all the operations of all the applications that are analyzed at runtime. This sequence may be temporal or not, depending on the field used for the analysis.
  unknown trace file format can be easily added to the parser engine by adding an appropriate description of a structure of the unknown file trace free of code implementation;
  they are capable of merging said new dataset without using a third part like a databases or a temporary file;
  they allow the user to manage trace data information at runtime, using one single Graphical User Interface;
  multiple trace files can be linked together using a special field of the trace file, either according to a positive logic (i.e. all trace files that satisfy a condition with the field value, said condition arising in particular from a user-query), or according to a negative logic (i.e. all trace files that do not satisfy a condition with the field value, said condition arising in particular from a user-query);
  there is no limitation on a special condition/key (like a timestamp) to link together multiple trace files, but on the contrary, many fields of the trace file might be used together;
  a filter can be applied at different levels of the tracing in order to have a fast feedback of analyzed trace data available for the user and a precise result.

The invention claimed is:

1. A method for tracing an execution of a plurality of software products, the method which comprises:
  collecting and internally listing in a list a plurality of trace files arising from executing multiple software;
  splitting the plurality of trace files in the list into a plurality of groups having different trace file formats;
  for each one of the plurality of groups, selecting in dependence on the trace file format of the one of the plurality of groups, an associated parser designed for reading the trace files of the one of the plurality of groups;
  reading the trace files of the one of the plurality of groups by way of the associated parser;
  extracting trace data;
  translating the extracted trace data into a new dataset configured for merging and filtering;
  showing at least a subset of the new dataset on a Graphical User Interface.

2. The method according to claim 1, which further comprises selecting a trace file according to a prefixed logic designed for selecting a specific trace file.

3. The method according to claim 1, which comprises determining the trace file format according to a rule matching method capable of recognizing at least one feature selected from the group consisting of a name and a signature of the trace file.

4. The method according to claim 1, which comprises creating a large filter that accepts every trace file.

5. The method according to claim 1, which comprises using a common parser for reading listed trace files.

6. The method according to claim 1, wherein the parser is capable of using a COM interface.

7. The method according to claim 1, which comprises transforming the extracted data into a COM object independent of the format of the trace file.

8. The method according to claim 1, which further comprises extending a parsing capability by integrating special COM objects characterized by a special COM interface.

9. The method according to claim 1, which comprises implementing at least one reading method designed for reading records and fields of the trace file.

10. The method according to claim 1, which further comprises providing an external library capable of implementing a reading method based on reading parameters for reading a structure of the trace file.

11. A non-transitory computer readable medium having a set of computer-executable instructions stored thereon for implementing a system for tracing an execution of multiple software products, the system comprising:
a collecting tool for collecting and internally listing in a list a plurality of trace files arising from executing multiple software;
determining means for splitting the plurality of trace files in the list into a plurality of groups having different trace file formats, said determining means, for each one of the plurality of groups, selecting in dependence on the trace file format of the one of the plurality of groups, an associated parser;
said associated parser being configured to read the trace files of the one of the plurality of groups and extract trace data of the trace files;
a translation device for translating the extracted trace data into a new dataset; and
a Graphical User Interface configured to show at least a subset of said new dataset.

12. The non-transitory computer readable medium according to claim 11, wherein said collecting tool comprises a prefixed logic designed for selecting specific trace files.

13. The non-transitory computer readable medium according to claim 11, wherein said determining means are capable of determining the trace file format by recognizing at least one feature selected from the group consisting of a name of the trace file itself and a signature of the trace file.

14. The non-transitory computer readable medium according to claim 11, wherein said determining means are configured to determine the format of the trace file according to a rule matching method.

15. The non-transitory computer readable medium according to claim 11, wherein said parser is configured for parsing the listed trace file on a user-query basis.

16. The non-transitory computer readable medium according to claim 11, wherein said determining means comprise a switch configured to automatically recognize a trace file format and apply a suitable query and parser to the trace file.

17. The non-transitory computer readable medium according to claim 11, wherein said parser is capable of using a COM interface.

18. The non-transitory computer readable medium according to claim 11, which further comprises an external library capable of implementing a reading method based on reading parameters for reading a structure of the trace file.

19. The non-transitory computer readable medium according to claim 11, which further comprises a standard interface common to all types of trace files.

20. The non-transitory computer readable medium according to claim 11, which further comprises a grid within said Graphical User Interface, said grid being designed for filtering data of the new dataset.

* * * * *